United States Patent [19]
Slaughter, III et al.

[11] Patent Number: 5,598,536
[45] Date of Patent: Jan. 28, 1997

[54] APPARATUS AND METHOD FOR PROVIDING REMOTE USERS WITH THE SAME UNIQUE IP ADDRESS UPON EACH NETWORK ACCESS

[75] Inventors: Frank G. Slaughter, III, Weston; Russell C. Gocht, Bedford; David McCool, Tewskbury, all of Mass.

[73] Assignee: Shiva Corporation, Burlington, Mass.

[21] Appl. No.: 287,775

[22] Filed: Aug. 9, 1994

[51] Int. Cl.$^6$ .................................................. H04J 3/02
[52] U.S. Cl. ................... 395/200.16; 395/200.15; 379/95
[58] Field of Search ................ 395/200.09, 200.06, 395/200.15, 200.16

[56] References Cited

U.S. PATENT DOCUMENTS

| | | | |
|---|---|---|---|
| 5,159,592 | 10/1992 | Perkins | 370/85.7 |
| 5,245,656 | 9/1993 | Loeb et al. | 380/23 |
| 5,309,437 | 5/1994 | Perlman et al. | 370/85.13 |
| 5,355,453 | 10/1994 | Row et al. | 395/200 |
| 5,416,842 | 5/1995 | Aziz | 380/30 |
| 5,442,633 | 8/1995 | Perkins | 370/94.1 |

FOREIGN PATENT DOCUMENTS 0483547 of 1992 European Pat. Off. .

OTHER PUBLICATIONS

International Search report for corresponding international application, 7 pages.

*Primary Examiner*—Krisna Lim
*Attorney, Agent, or Firm*—Fish & Richardson, P.C.

[57] ABSTRACT

A remote access server provides a remote user with access to a local computer network. The server receives a user identification string from its communication port, the string having been entered by the remote user at a remote computer which is coupled to the communication port. The string identifies the remote user. The server uses the string to access a database and determine an internet protocol (IP) address associated with the string. The remote computer needs the IP address to communicate on the local computer network. The database includes a user identification string for each remote user and an IP address for each string. The remote access server sends the IP address to the remote computer via the communication port. The server then allows the remote computer to access the local computer network and to communicate on the local computer network using the IP address.

19 Claims, 2 Drawing Sheets

APPARATUS AND METHOD FOR PROVIDING REMOTE USERS WITH THE SAME UNIQUE IP ADDRESS UPON EACH NETWORK ACCESS

FIELD OF THE INVENTION

This invention relates to an apparatus and method for providing a remote user at a remote computer with access to a local computer network, and more particularly to a remote access server which provides the access by assigning an internet protocol (IP) address to the remote user.

BACKGROUND OF THE INVENTION

The client-server computer networking model allows organizations of all sizes to utilize group productivity products such as e-mail. Many business organizations have grown to rely heavily on network services. Employees who travel typically need to access the same network services and resources provided to them at work. Field offices also frequently need to access the headquarter's network services. The term "telecommuter" has been used to describe an employee who stays at home and conducts business by accessing the network services provided at the traditional worksite. These types of users are sometimes referred to as "remote" because they typically are located in a physically remote place from the networks and because they do not connect to the networks locally or directly. Remote users typically connect to the networks via telephone lines. The terms "remote access" and "remote networking" are used to identify the situation in which a remote user accesses a computer network over analog or digital telephone lines.

A remote user generally can utilize any type of computer to access the network. The computer can be, for example, a personal computer, a workstation, or a portable computer such as a laptop computer or a notebook computer. Also, the computer can be, for example, an IBM PC or compatible, an Apple Macintosh, or a Unix-based computer. The user typically connects a modem or similar communication device to a serial port of the computer. The modem connected to the user's remote computer communicates over the telephone lines with another modem which is coupled to a server. The other modem and the server are located at the network which the remote computer is attempting to access. The server is coupled directly to the network. It is the server which provides the remote computer with controlled access to the network and the services and resources thereon. The server is referred to as a "remote access server," and it typically includes a serial port for connecting to the other modem, a port for connecting to the network, and electronics which include at least a microprocessor and memory.

It is desirable for the remote access server to have a variety of features. For example, the remote access server should make accessing the network transparent to the remote user. The remote access server also should be easy for a network manager to install and maintain.

SUMMARY OF THE INVENTION

It is an object of the invention to provide a remote access server which allows one or more remote computers to access simultaneously a local computer network, even if each of the remote computers employs a different protocol (e.g., IPX, TCP/IP, AppleTalk, NetBEUI, or 802.2/LLC).

It is another object of the invention to provide a remote access server which provides user authentication and security features. One aspect of these features is that the server assigns, on a "per-user" basis, an internet protocol (IP) address which a remote computer needs with some protocols, such as TCP/IP, to communicate on the network. With per-user IP address assignment, the server ensures that each remote user has the same IP address every time that remote user makes a remote access connection to the network via the server, even though that remote user may utilize a different remote computer every time a remote access connection is made. The server uses a user identification string, which is entered into the remote computer by the remote user, to retrieve from a server-internal or server-external database the corresponding IP address for that remote user. The database typically is centrally maintained by a network manager with authority to add and delete remote users and IP addresses.

Because each remote user has an IP address under the per-user IP addressing scheme, it is possible to track via IP address the network services accessed by particular remote users. Once a user has been provided access to the network itself, following any type of optional user authentication procedure which includes but is not limited to the use of the per-user IP address, it is possible to use IP addresses to ensure that only certain remote users are allowed access to specific network services. By providing IP addresses on a per-user basis, the network administrator is able to utilize standard functionality, which resides in various network services, to authorize access to each such service on a per-user basis.

Per-user assignment of IP addresses is very different from other IP addressing schemes such as "per-port" schemes and "remote computer-supplied" schemes. With per-port IP address assignment, each port of the server has an IP address and that IP address is assigned to whichever remote computer happens to dial into that port. With remote computer-supplied IP address assignment, the server allows the remote computer to identify its own IP address which typically is pre-configured into the remote computer. Both per-port and remote computer-supplied IP addressing, unlike per-user IP addressing, do not provide one-to-one correspondence between each remote user and each IP address. These two other IP addressing schemes also do not, unlike per-user IP addressing, tie network access to remote user identity. It is not possible with either per-port or remote computer-supplied IP addressing to use IP address to determine whether a particular remote user is actually entitled access to specific network services because the IP address is tied to the server's ports or the remote computer and not to the remote user himself or herself.

Other objects, aspects, features, and advantages of the invention will become apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
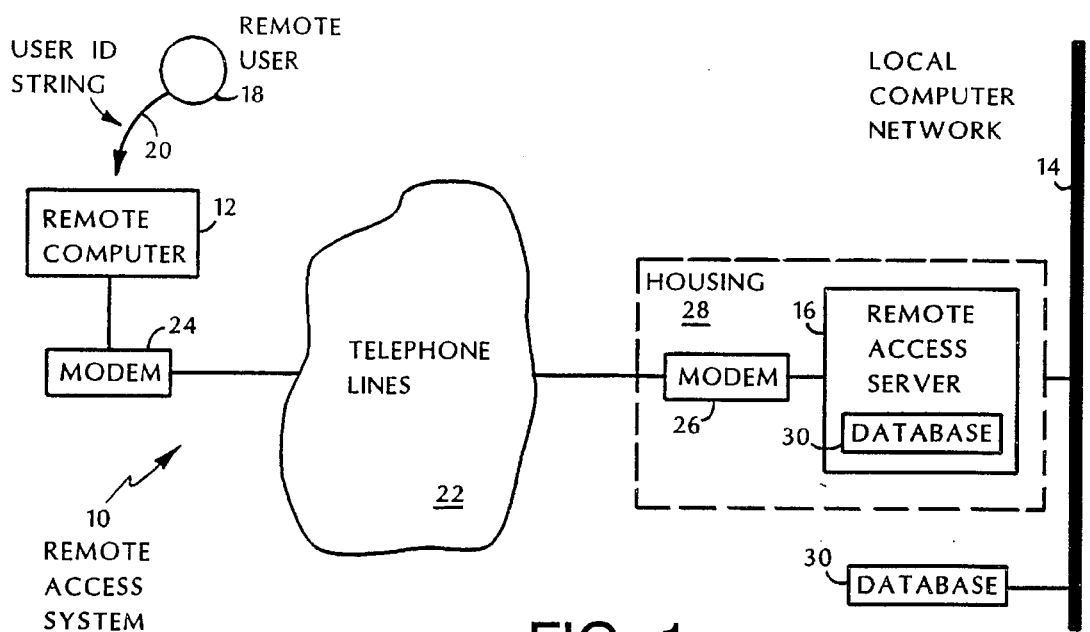
FIG. 1 is a diagram of a remote access system in which a remote access server according to the invention provides a remote user at a remote computer with access to a local computer network.

Referring to FIG. 1, in a remote access system 10, a remote computer 12 is allowed access to a local computer network 14 by a remote access server 16. As will be described in more detail later with reference to FIG. 4, the remote access server 16 is itself a powerful programmable computer. In the disclosed embodiment, the remote access server 16 is a LanRover which is available from Shiva Corporation of Burlington, Mass. A remote user 18 at the remote computer 12 initiates an attempt to gain access to the network 14 (and the network services and resources available thereon) via the remote access server 16 by entering a user identification (ID) string 20 into the remote computer 12. The user ID string is a predetermined code which uniquely identifies the remote user, and it typically is assigned to the remote user by a network manager who has central control of and responsibility for the network 14 and the maintenance thereof.

The user ID string 20 entered by the remote user 18 is sent by the remote computer 12 to the remote access server 16 over telephone lines 22. The term telephone lines 22 is used herein to mean any digital and/or analog communication link or links used to transmit voice and/or data including wireless links and cellular data links such as Cellular Digital Packet Data (CDPD). In the disclosed embodiment, a modem 24 is connected to the remote computer 12, and another modem 26 is connected to the remote access server 16. The modems 24, 26 allow the remote computer 12 and the remote access server 16 to communicate over the telephone lines 22. Note that the modem 26 connected to the remote access server 16 could be part of the server 16 (e.g., included within the server housing), as indicated by the dotted-line box 28 enclosing the server 16 and the modem 26 connected thereto. Also note that the modems 24, 26 could be Integrated Services Digital Network (ISDN) terminal adapters if the telephone lines 22 are the ISDN, or the modems 24, 26 could be any of a variety of other switched-access devices.

The remote access server 16 receives the user ID string 20 which was entered by the remote user 18 and sent by the remote computer 12. An optional user authentication procedure may occur at this time where a remote user proves his or her identity by entering a password, by reference to an authentication server database, or by any other method. Once the remote user is authenticated, that remote user is granted access to the network. Further authorization may occur in order for an authenticated user to become an authorized user and be granted access to specific network services. In any event, the server 16 uses the user ID string 20 to index into a database 30 and retrieve an Internet Protocol (IP) address associated with the user ID string 20. With some protocols, such as the Transmission Control Protocol/Internet Protocol (TCP/IP), the remote computer 12 must have an IP address in order to communicate on the network 14 and access the network services and resources available thereon. The database 30 can be resident in the remote access server 16, or it can be maintained on a node (e.g., a database server) on the network 14. The database 30 includes a unique user ID string for each remote user and a unique IP address for each user ID string. The database 30 typically is maintained by a network manager who has central control of and responsibility for the network 14 and the maintenance thereof. The network manager generally controls (e.g., has the authority and ability to define, add, and delete) remote user names, user ID strings, and IP addresses.

After the remote access server 16 determines a unique IP address based on the user ID string 20 by referring to the database 30, the server 16 sends the unique IP address to the remote computer 12 via, for example, the modems 24, 26 and the telephone lines 22. The remote computer 12 gains access to the network 14 through the remote access server 16 and uses the IP address to communicate with, and utilize the services and resources available on, the network 14.

The remote access server 16 will not allow a remote computer 12 to gain access to the network 14 unless the remote user 18 enters a valid user ID string 20 at that remote computer 12. That is, if the remote access server 16 searches the database 30 but fails to find an IP address associated with the user ID string 20 which the remote user 18 entered at the remote computer 12 (because, for example, the user ID string is not in the database 30 at all or it is in the database 30 but there is no associated IP address listed in the database 30), the remote access server 16 will not transmit an IP address to the remote computer 12, and thus the remote computer 12 (and the remote user 18) will not be able to communicate on the network 14. In this situation, the remote access server 16 will not pass any data from the remote computer 12 or the remote user 18 on to the network 14.

The remote access server 16 thus ensures that each "authorized" remote user 18 receives the same, unique IP address every time that remote user 18 makes a remote access connection to the network 14 via the server 16, even though that remote user 18 may utilize a different remote computer 12 every time a remote access connection is made. A remote user 18 is "authorized" if his or her name, unique user ID string, and unique IP address are contained in the database 30. Again, a network manager typically centrally controls and maintains the database 30 and its contents. By linking network access to the identity of the individual remote users, the remote access server 16 can effectively restrict network access to specific network services based on IP address.

The user authorization feature allows an authorized remote user's use of network services and resources to be tracked via IP address. That is, the remote access server 16 can keep a log of a particular remote user's network activities because (i) all data exchanged between the network 14 and the remote user's remote computer 12 passes through the server 16 and (ii) the IP address used by the remote user's remote computer 12 uniquely identifies the remote user 18. The server 16 typically will examine more of the data than just the IP address in order to determine exactly what network service or resource is being accessed by the authorized remote user 18. The remote access server 16 can keep the log in the database 30 or in any other storage location which can be on or off the network 14 (e.g., a tape or disk drive).

Figure 2:
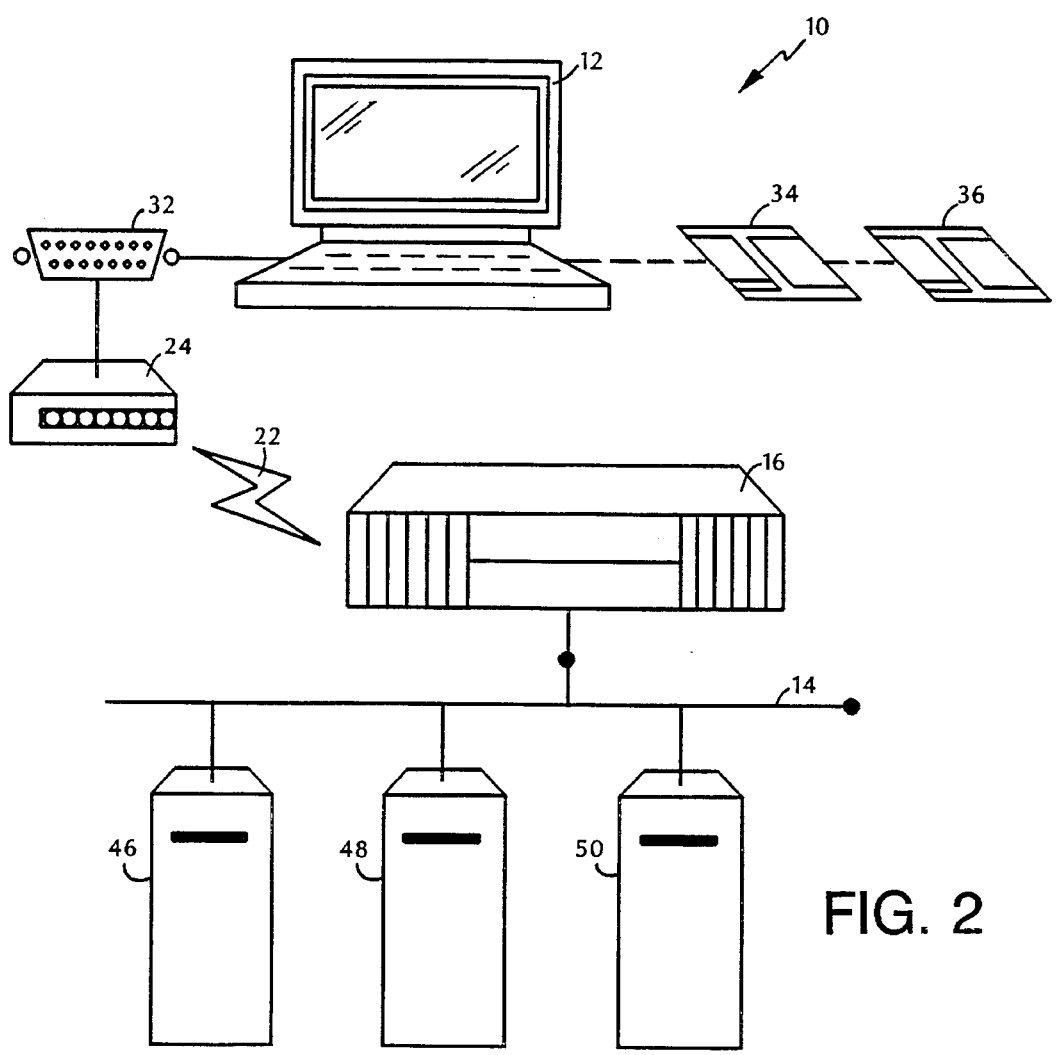
FIG. 2 is a diagram of a remote access system shown in more detail than the system shown in FIG. 1.

The remote access system 10 shown generally in FIG. 1 is shown in more detail in FIG. 2. Referring to FIG. 2, the remote computer 12 is a portable laptop computer. In general, the remote computer 12 can be any type of portable computer (e.g., a laptop or a notebook), workstation, or personal computer (e.g., an IBM PC or compatible, an Apple Macintosh, or a Unix-based computer). The remote computer 12 generally must be able to function as a stand-alone computer system when not connected to a network, and as a full network node when it is dialed-in to the network 14 through the remote access server 16. For a remote Macintosh system, it generally is preferred that the computer have a 25 MHz 68030 processor. For a remote PC system, it generally is preferred that the computer have at least a 25 MHz 486 processor.

The remote access system 10 described herein is not to be confused with a remote control system. In a remote control system, a remote user dials-in to the local network with his or her remote computer and takes control of a local computer on the network. Once the remote user's remote computer is connected to the local network in a remote control system, the remote user actually uses the local computer, not the remote computer. That is, only user-interface data (e.g., screen images and keyboard/mouse input) are transferred to the remote computer from the local computer; the remote computer acts as a dumb terminal in a remote control system.

A remote control system is very different from the remote access system 10. In the remote access system 10, the remote computer 12 must perform adequately by itself, with enough processing power, memory, and disk storage space to run (on the remote computer 12 itself) the remote user's chosen applications without relying upon the on-network communication speed which typically is much higher than the speed of the telephone line link 22. Some telephone lines 22 allow speeds of up to 57.6 kilobits per second whereas the local computer network 14 can operate in ranges from 1 to 100 megabits per second depending on the type of network. The local computer network 14 can be, for example, Ethernet or Token Ring.

The remote computer 12 typically will have a serial port 32 which is managed by a serial controller such as a 16550A serial controller chip which can receive or transmit up to sixteen characters without intervention from the central processing unit (CPU) of the remote computer 12. The modem 24 connected to the serial port 32 can be, for example, a V.32bis modem (14.4 kilobits per second) or an ISDN terminal adapter. The other modem 26 (which is not shown in FIG. 2 because it is internal to the remote access server 16) is selected to operate properly given the telephone lines 22 employed and the modem 24 connected to the serial port 32.

The network services and resources available on the network 14 which the remote user 18 might access via the remote access server 16 can include, for example, a Notes Server 46, an E-Mail Server 48, and a Database Server 50. The Database Server 50 can be used to maintain the database 30 of user names, user ID strings, and IP addresses which was described previously with reference to FIG. 1.

The remote computer 12 can be loaded with network application software 34 and remote access client software 36. The remote access client software 36 can allow, as a relevant example, a Unix-based computer to use a standard Point-to-Point Protocol (PPP) implementation, and a PC-based computer to use any standard (if any) or vendor-supplied remote access clients. A remote access client includes a "dialer" which establishes and terminates the remote access connection and a "driver" which interfaces with the network protocol stacks and the serial port 32 to send and receive network data. The remote access client can operate with a variety of protocols including IPX, TCP/IP, NetBEUI, LLC/802.2, and AppleTalk. Novell's IPX is the native protocol for NetWare. TCP/IP is widely used in Unix-based systems and client-server databases, and TCP/IP also is becoming standard for many other applications. NetBEUI is used for LAN Manager and Microsoft's Windows for Workgroups. LLC/802.2 is for IBM LAN Server and host connectivity. The combination of AppleTalk and TCP/IP covers almost all Macintosh applications.

Figure 4:
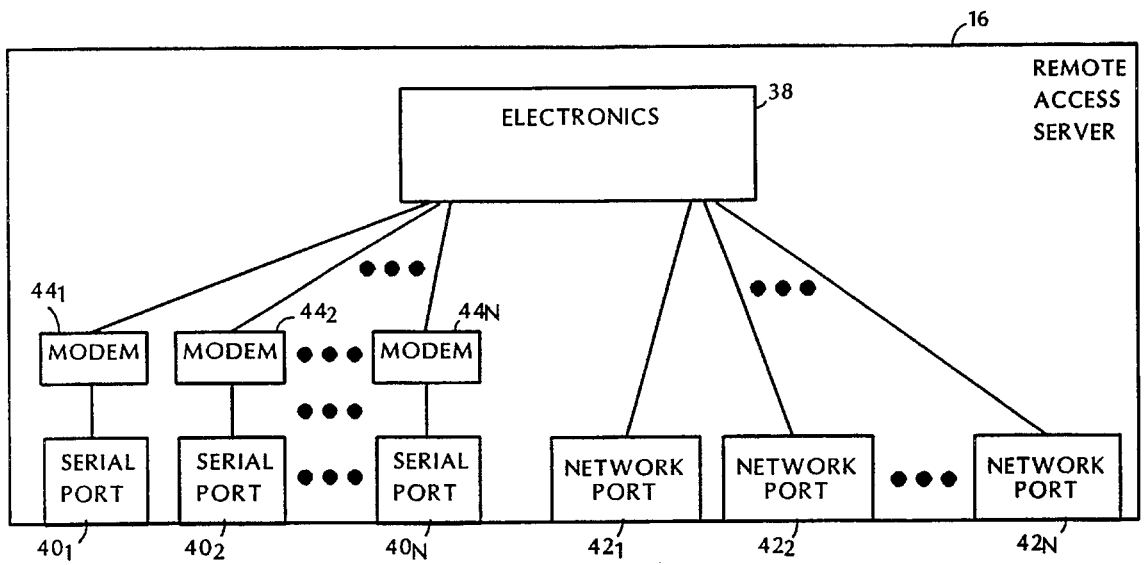
FIG. 4 is a block diagram showing major components of a remote access server according to the invention.

The performance of the remote access server 16 is primarily determined by the ability to move data through its serial ports (shown in FIG. 4 but not in FIG. 2) without much attention from its CPU (also shown in FIG. 4 but not in FIG. 2). The performance of the server 16 also is determined by its CPU's ability to perform the routing, filtering, IP address tracking, etc. that the CPU must do without adding undue delays as it forwards data packets. The server 16 thus has generally been optimized for serial port throughput and general CPU power. Because the server 16 must be highly reliable and efficient, it includes solid-state, non-volatile storage for the controlling software. The software is upgradeable via downloading from the network 14 to the server 16. The network manager can perform any upgrades.

The software in the remote access server 16 causes the server 16 to perform the various functions described herein, although it should be noted that it is possible to use dedicated electronic hardware to perform all server functionality described herein. The steps which the server performs in order to provide a remote user at a remote computer with access to a local computer network according to the invention are shown in FIG. 3.

Figure 3:
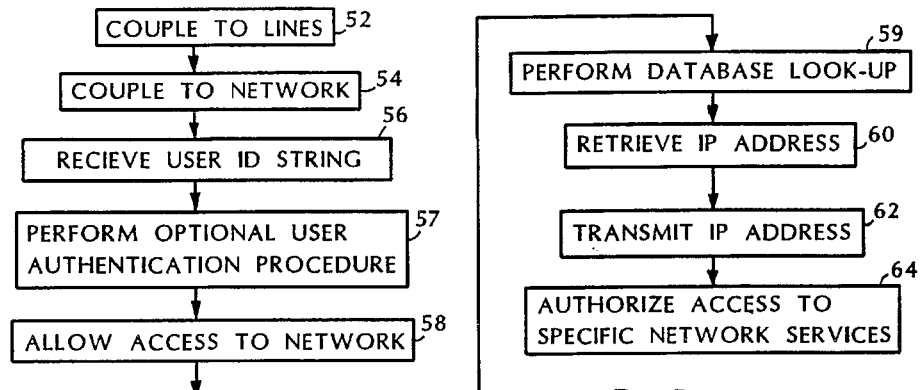
FIG. 3 is a flowchart of the steps a remote access server performs in order to provide a remote user at a remote computer with access to a local computer network according to the invention.

Referring to FIG. 3, it is first necessary to set-up the connections by coupling a communication port of the remote access server to the telephone lines (step 52) and coupling a network port of the remote access server to the local computer network (step 54). The server is now ready to receive a dial-in from a remote computer over the telephone lines and to communicate on the local network. After the remote access server is set-up, the remote user can cause the remote computer to dial-in and connect to the server over the telephone lines. The remote user then enters into the remote computer a unique user ID string which the remote computer sends to the server over the telephone lines. The user ID string uniquely identifies that remote user. The remote access server receives the user ID string from the communication port (step 56). An optional user authentication procedure may occur at this time where a user proves his or her identity by entering a password, by reference to an authentication server database, or by any other method (step 57). Once the remote user is authenticated, that remote user is granted access to the network (step 58). Further authorization may occur in order for an authenticated user to become an authorized user and be granted access to specific network services. The remote access server then uses the received user ID string to perform a look-up in the database of user ID strings and IP addresses (step 59). The remote access server retrieves from the database the unique IP address associated with the user ID string, if any (step 60). The remote access server then sends the retrieved unique IP address to the remote computer via the communication port and the telephone lines (step 62). The remote access server then allows the remote computer to access the local computer network and to communicate on the network using the unique IP address (step 64).

Table 1 below shows the database. A variety of other configurations can be employed for the database. Also, the database can include different and/or additional parameters.

TABLE 1

Database Remote User Information

| USER ID 1 | NAME 1 | IP ADDRESS 1 |
|---|---|---|
| USER ID 2 | NAME 2 | IP ADDRESS 2 |
| USER ID 3 | NAME 3 | IP ADDRESS 3 |
| . | . | . |
| . | . | . |
| . | . | . |
| USER ID N | NAME N | IP ADDRESS N |

The data packets used in the remote access system according to the invention preferably are standard internet protocol packets, although other data packet formats can be employed.

Referring now to FIG. 4, in one embodiment, the remote access server 16 includes electronics 38, a plurality of serial communication ports $40_1$–$40_N$, and a plurality of network ports $42_1$–$42_N$. The server 16 also can include a plurality of internal modems $44_1$–$44_N$. The serial ports 40 and the network ports 42 are controlled by the electronics 38.

The electronics 38 include, in some embodiments, a powerful 16 MHz 68EC020 microprocessor and memory such as 1 megabyte of battery backed-up static random access memory (SRAM) and 64 kilobytes in an erasable programmable read only memory (EPROM).

Each of the serial communication ports 40 is for coupling with a communication device (e.g., the modem 26 of FIG. 1), or for coupling directly with the telephone lines 22, to provide for communication with a remote computer (e.g., the remote computer 12 of FIGS. 1 and 2) over the telephone lines 22. A connecting cable can be used to couple a serial port 40 with the communication device or with the telephone lines. Each of the serial ports 40 can simultaneously be coupled to a different one of the plurality of remote computers so as to provide simultaneous access to a local computer network for each of the remote computers, even if each of the remote computers employs a different protocol (e.g., IPX, TCP/IP, AppleTalk, NetBEUI, or 802.2/LLC). In some embodiments, the server 16 includes either four or eight serial ports 40, and each port 40 is a DB-25 asynchronous serial port which supports speeds of up to 57.6 kilobits per second (kbps). In some other embodiments, the server 16 includes four 57.6 kbps ports 40 with an internal V.32bis modem 44 associated with each, and four high-speed (115.2 kbps) serial ports 40 with no internal modem associated therewith. In some other embodiments, the server 16 includes a single port 40 for use with ARA.

Each of the network ports 42 is for coupling with a local computer network (e.g., the network 14 of FIGS. 1 and 2), via a connecting cable, to provide for communication with the network. Typically, the server 16 is connected to only one network during normal operation. In some embodiments, the server 16 includes three network ports 42, one for 10BaseT Ethernet, one for Thin Ethernet, and one for Thick Ethernet. In some other embodiments, the server 16 includes a single network port 42 for Token Ring. In some other embodiments, the server 16 includes a single network port 42 for use with Apple LocalTalk.

The remote access server 16 shown functionally in FIG. 4 can be contained in a housing similar to that shown in FIG. 2. The housing is less than or equal to about 1.7 by 17 by 10 inches. The housing can be made rack-mountable.

Other modifications and implementations will occur to those of ordinary skill in the art without departing from the spirit and the scope of the invention as claimed. Accordingly, the invention is to be defined not by the preceding illustrative description but instead by the following claims.

What is claimed is:

1. A method for providing a remote user with access to a computer network, comprising:

receiving a user identification string from a communication port, the string having been entered by the remote user at a remote computer which is coupled to the communication port, the string uniquely identifying the remote user;

using the user identification string to access a database and retrieve a unique internet protocol (IP) address associated with the user identification string, the remote computer needing the IP address to communicate on the computer network, the database including a unique user identification string for each remote user and a unique IP address for each user identification string such that the same unique IP address is retrieved every time a particular remote user enters the user identification string uniquely identifying that remote user;

sending the IP address to the remote computer via the communication port; and allowing the remote computer to access the computer network and to communicate on the computer network using the IP address.

2. The method of claim 1 further comprising maintaining the database.

3. The method of claim 1 further comprising coupling a communication device to the communication port for communicating with the remote computer.

4. The method of claim 3 wherein the communication port is a serial port.

5. The method of claim 4 wherein the communication 2 device is a modem.

6. A method for providing a remote user with access to a computer network, comprising:

providing a communication port to provide for communication with a remote computer;

coupling a network port to the computer network to provide for communication with the computer network, the remote computer needing an internet protocol (IP) address to communicate on the computer network;

receiving from the communication port a user identification string which was entered by the remote user at the remote computer and which uniquely identifies the remote user;

using the unique user identification string to access a database and retrieve a unique IP address associated with the user identification string, the database including a unique user identification string for each remote user and a unique IP address for each user identification string such that the same unique IP address is retrieved every time a particular remote user enters the user identification string uniquely identifying that remote user;

sending the IP address to the remote computer via the communication port; and allowing the remote computer to access the computer network and to communicate on the computer network using the IP address.

7. The method of claim 6 further comprising coupling a plurality of communication ports such that a plurality of remote computers are provided simultaneous access to the local computer network after each remote computer is sent an IP address.

8. The method of claim 6 further comprising maintaining the database.

9. The method of claim 6 further comprising coupling a communication device to the communication port for communicating with the remote computer.

10. The method of claim 9 wherein the communication port is a serial port.

11. The method of claim 10 wherein the communication device is a modem.

12. A server for providing a remote user with access to a computer network, comprising:

at least one communication port to provide for communication with a remote computer;

at least one network port for coupling to the computer network to provide for communication with the computer network, the remote computer needing an internet protocol (IP) address to communicate on the computer network; and processing electronics for:
controlling the communication port and the network port,
receiving from the communication port a user identification string which was entered by the remote user at the remote computer and which uniquely identifies the remote user,
using the user identification string to access a database and retrieve a unique IP address associated with the user identification string, the database including a unique user identification string for each remote user and a unique IP address for each user identification string such that the same unique IP address is retrieved every time a particular remote user enters the user identification string uniquely identifying that remote user,
sending the IP address to the remote computer via the communication port, and
allowing the remote computer to access the computer network through the server and to communicate on the computer network using the IP address.

13. The server of claim 12 further comprising a plurality of communication ports such that a plurality of remote computers are provided simultaneous access to the local computer network through the server after each remote computer is sent an IP address.

14. The server of claim 12 wherein the processing electronics includes a microprocessor and memory.

15. The server of claim 12 wherein the database is maintained internally by the server.

16. The server of claim 12 wherein the database is maintained on the local computer network and external from the server.

17. The server of claim 12 further comprising a communication device coupled to the communication port for communicating with the remote computer.

18. The server of claim 17 wherein the communication port is a serial port.

19. The server of claim 18 wherein the communication device is a modem.

* * * * *